United States Patent [19]

Wu

[11] Patent Number: 5,582,372
[45] Date of Patent: Dec. 10, 1996

[54] FOLDING COLLAPSIBLE GOLF CART FRAME ASSEMBLY

[76] Inventor: Ching-Chang Wu, No. 35-1, Jih Hsin Street, Tu Cheng Hsiang, Taipei Hsien, Taiwan

[21] Appl. No.: 588,884

[22] Filed: Jan. 19, 1996

[51] Int. Cl.⁶ .................................................. A63B 55/00
[52] U.S. Cl. .................... 248/96; 280/47.26; 280/47.315; 280/646; 280/DIG. 6; 403/325
[58] Field of Search .................. 248/96, 166; 280/47.26, 280/47.315, 646, DIG. 6; 403/321, 325, 326, 327

[56] References Cited

U.S. PATENT DOCUMENTS

| | | | |
|---|---|---|---|
| 2,610,875 | 9/1952 | Wheelden | 403/326 X |
| 2,855,208 | 10/1958 | Abgarian | 280/DIG. 6 X |
| 2,926,925 | 3/1960 | Ozlek | 280/DIG. 6 X |
| 3,079,166 | 2/1963 | Abgarian | 248/96 X |
| 3,100,048 | 8/1963 | Halverson | 248/96 X |
| 3,459,434 | 8/1969 | Dulaney | 248/96 X |
| 5,249,822 | 10/1993 | Wu | 280/DIG. 6 X |
| 5,281,044 | 1/1994 | Chen | 280/DIG. 6 X |
| 5,288,099 | 2/1994 | Wu | 280/DIG. 6 X |
| 5,421,604 | 6/1995 | Wu | 280/DIG. 6 X |
| 5,427,402 | 6/1995 | Huang | 403/327 X |
| 5,464,238 | 11/1995 | Wu | 280/DIG. 6 X |
| 5,496,054 | 3/1996 | Wu | 280/DIG. 6 X |

FOREIGN PATENT DOCUMENTS

| | | | |
|---|---|---|---|
| 4235926 | 4/1994 | Germany | 248/96 |

Primary Examiner—Ramon O. Ramirez
Assistant Examiner—Michael J. Turgeon
Attorney, Agent, or Firm—Varndell Legal Group

[57] ABSTRACT

A folding collapsible golf cart frame assembly including a main shaft to hold two bag cradles, a handle bracket and a wheel holder bracket fixed to the main shaft, handle bar having a connecting block at one end pivoted to the handle bracket, two links pivotably connected between a wheel holder on the wheel holder bracket and the connecting block, a locating block fixed to the main shaft, a locking plate slidably mounted on the handle bar and having a retainer block for fastening to the locating block to hold the handle bar in the operative position, and two springs connected between the connecting block and the locking plate, wherein the handle bar has a stop rod inserted into a longitudinal sliding slot on the locking plate to limit the axial moving distance of the locking plate; the retainer block of the locking plate has retainer head with a hooked retaining portion and a sloping guide wall portion; the locating block has a stop wall for engagement with the retainer block of the locking plate, and a retaining hole for the insertion of the retainer block of the locking plate, permitting the hooked retainer portion of the retainer block to be forced into engagement with an inner side of the stop wall of the locating block by the springs; the connecting block has a projecting stop wall, which is stopped at the main shaft to keep the handle bar and the main shaft in a parallel relation when the retainer block of the locking plate is fastened to the shell of the locating block.

1 Claim, 12 Drawing Sheets

5,582,372

FOLDING COLLAPSIBLE GOLF CART FRAME ASSEMBLY

BACKGROUND AND SUMMARY OF THE INVENTION

The present invention relates to a folding collapsible golf cart, and relates more particularly to the folding collapsible frame assembly of a folding collapsible golf cart.

The frames of regular golf carts are commonly made collapsible so that they can be collapsed to reduce the storage space when they are not in use. FIGS. 1 and 2 show a folding collapsible golf cart frame assembly according to U.S. Pat. No. 5,294,822. This structure of folding collapsible golf cart frame assembly uses a locating plate to releasably hold the handle bar in the operative position. However, this structure of folding collapsible frame is not durable in use because the springs which are installed inside the locking plate and frequently stretched by the locking plate will wear with use quickly. Another drawback of this structure of folding collapsible golf cart frame assembly is that the locating plate tends to vibrate during the movement of the golf cart, thereby causing a noise produced. FIGS. 3 and 4 show another structure of folding collapsible golf cart frame assembly according to U.S. Pat. No. 5,464,238, which can be adjusted between two angles. This structure of folding collapsible golf cart frame assembly uses a locking plate to secure the handle bar in the operative position. The locking plate is slidably mounted on the handle bar to hold a stop plate. The stop plate is fastened to the locking plate by screws, and supported on springs. However, the stop plate tends to vibrate when the golf cart is moving. When the stop plate vibrates, it will produce a noise, and the screws will be loosened. Another drawback of this structure of folding collapsible golf cart frame assembly is that the front end of the handle bar is not supported on the main shaft when it is extended out, and therefore the handle bar tends to vibrate. Furthermore, because of the limitation of the locating block which is provided for holding the locking plate, the adjusting angle of the handle bar is limited.

The present invention has been accomplished to provide a folding collapsible golf cart frame assembly which eliminates the aforesaid drawbacks. According to one aspect of the present invention, the folding collapsible frame comprises a main shaft to hold two bag cradles, a handle bracket and a wheel holder bracket fixed to the main shaft, handle bar having a connecting block at one end pivoted to the handle bracket, two links pivotably connected between a wheel holder on the wheel holder bracket and the connecting block, a locating block fixed to the main shaft, a locking plate slidably mounted on the handle bar and having a retainer block for fastening to the locating block to hold the handle bar in the operative position, and two springs connected between the connecting block and the locking plate, wherein the handle bar has a stop rod inserted into a longitudinal sliding slot on the locking plate to limit the axial moving distance of the locking plate. According to another aspect of the present invention, the retainer block of the locking plate has a retainer head with a hooked retaining portion and a sloping guide wall portion. According to still another aspect of the present invention, the locating block has a stop wall for engagement with the retainer block of the locking plate, and a retaining hole for the insertion of the retainer block of the locking plate, permitting the hooked retainer portion of the retainer block to be forced into engagement with an inner side of the stop wall of the locating block by the springs. According to still another aspect of the present invention, the connecting block has a projecting stop wall, which is stopped at the main shaft to keep the handle bar and the main shaft in a parallel relation when the retainer block of the locking plate is fastened to the shell of the locating block.

BRIEF DESCRIPTION OF THE DRAWINGS

FIG. 5 is a side view showing the folding collapsible golf cart frame assembly extended out according to the present invention.

DETAILED DESCRIPTION OF THE PREFERRED EMBODIMENT

Figure 1:
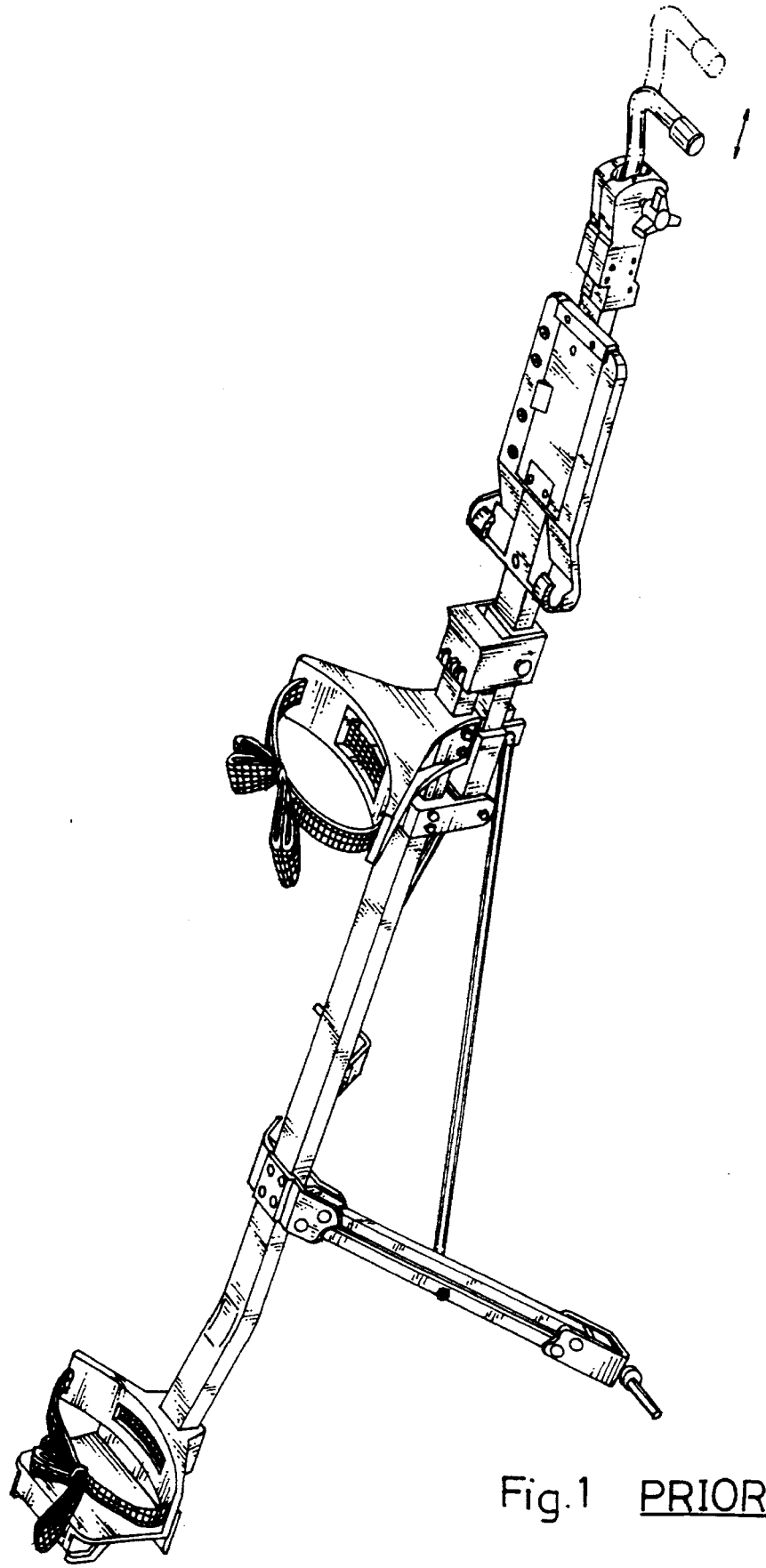
FIG. 1 shows a folding collapsible golf cart frame assembly according to the prior art.
Figure 2:
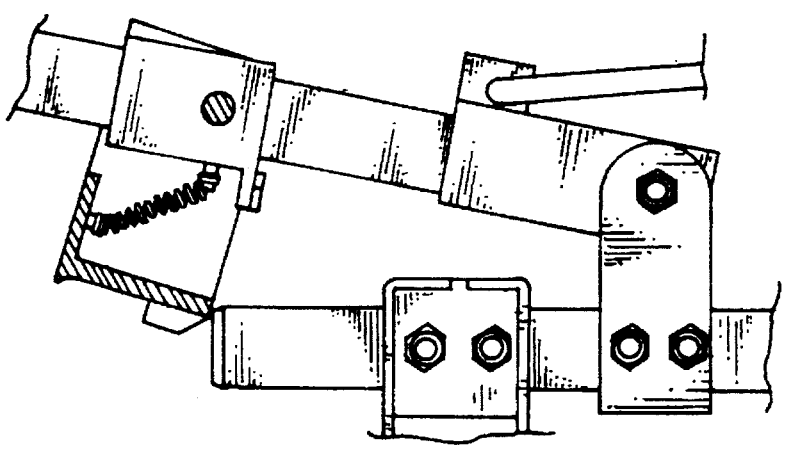
FIG. 2 is a partial view in section of the folding collapsible golf cart frame assembly shown in FIG. 1.
Figure 3:
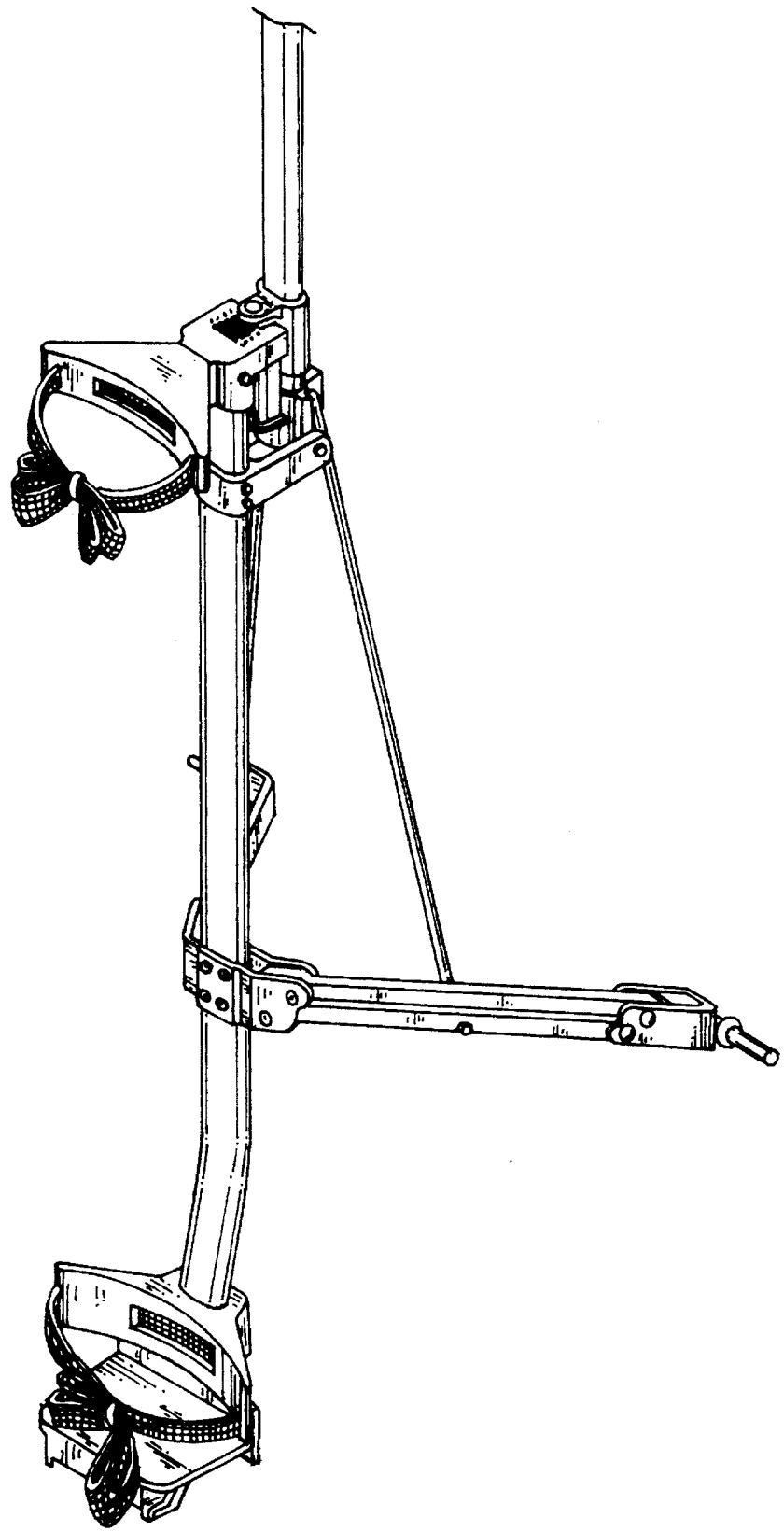
FIG. 3 shows another structure of folding collapsible golf cart frame assembly according to the prior art.
Figure 4:
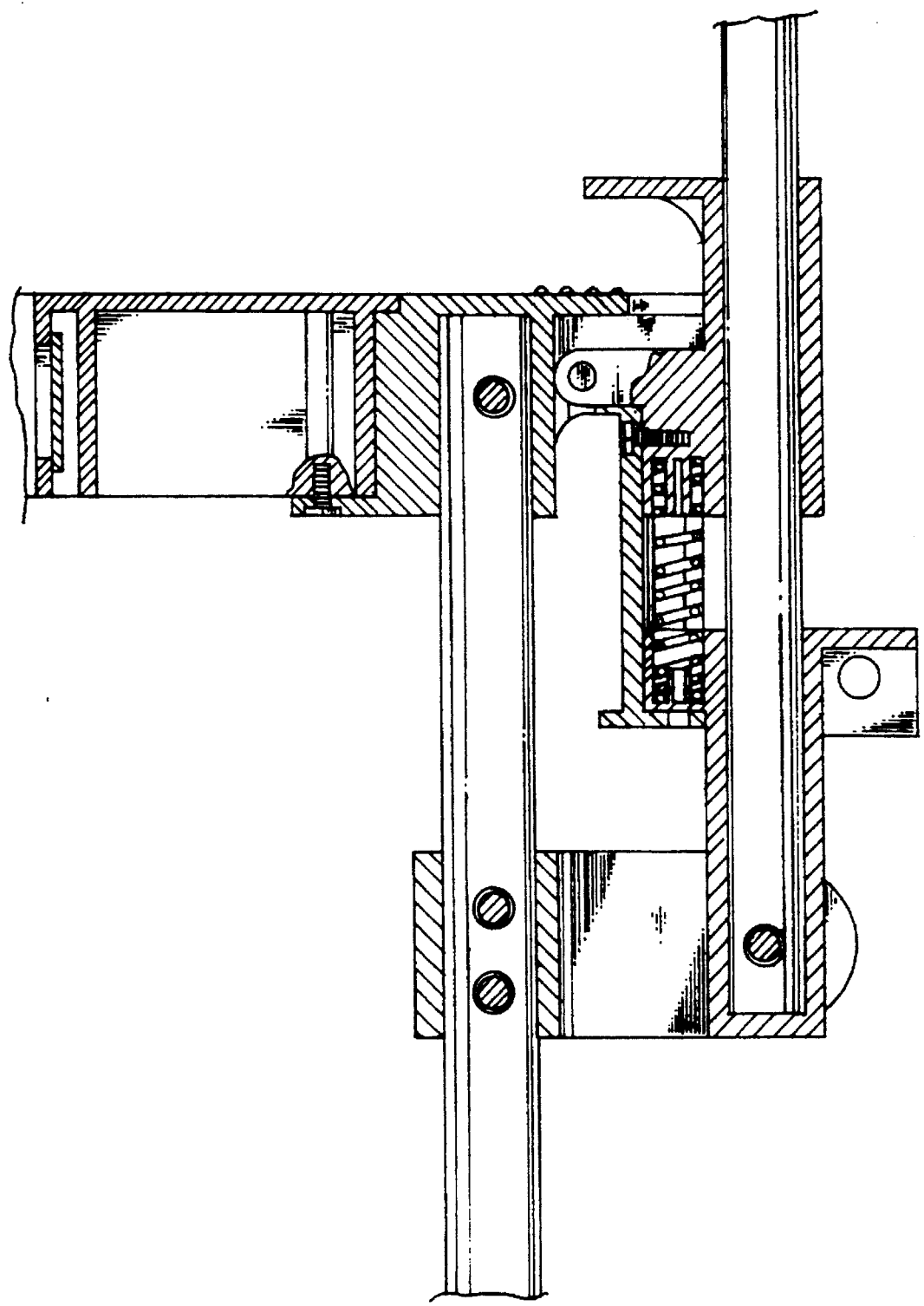
FIG. 4 is a partial view in section of the folding collapsible golf cart frame assembly shown in FIG. 3.
Figure 5:
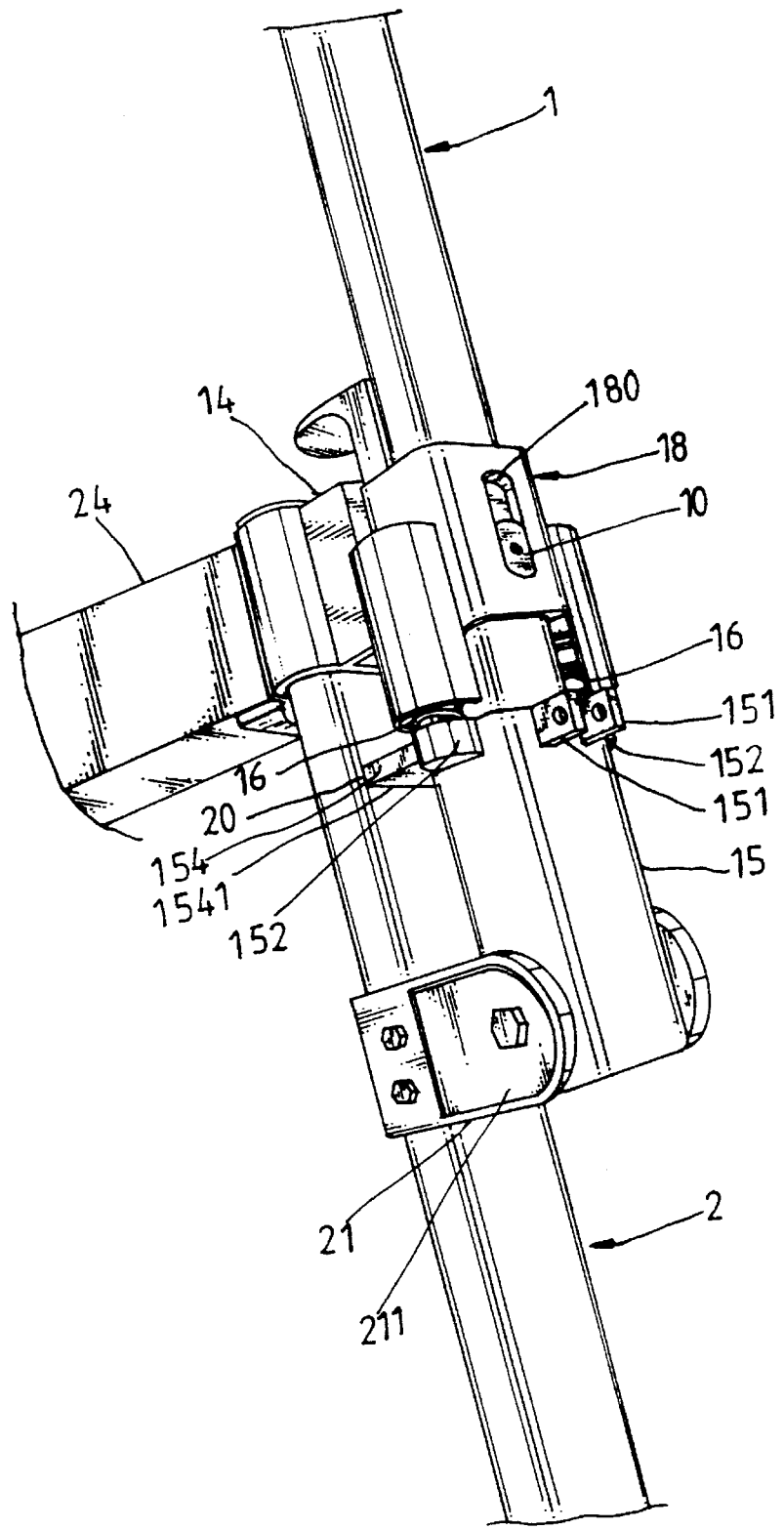
FIG. 5 is an elevational view of a folding collapsible golf cart frame assembly according to the present invention.
Figure 6:
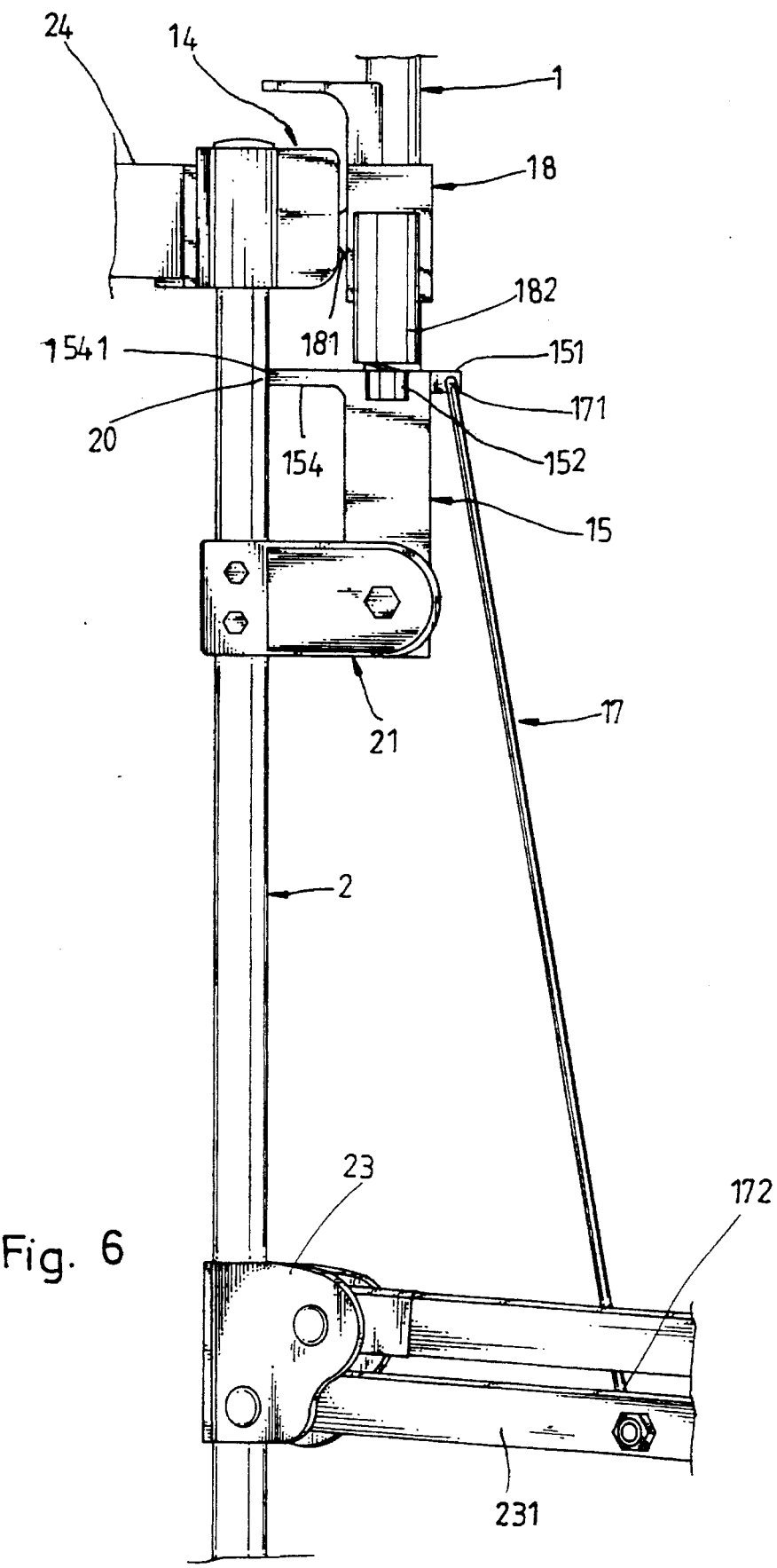
Figure 7:
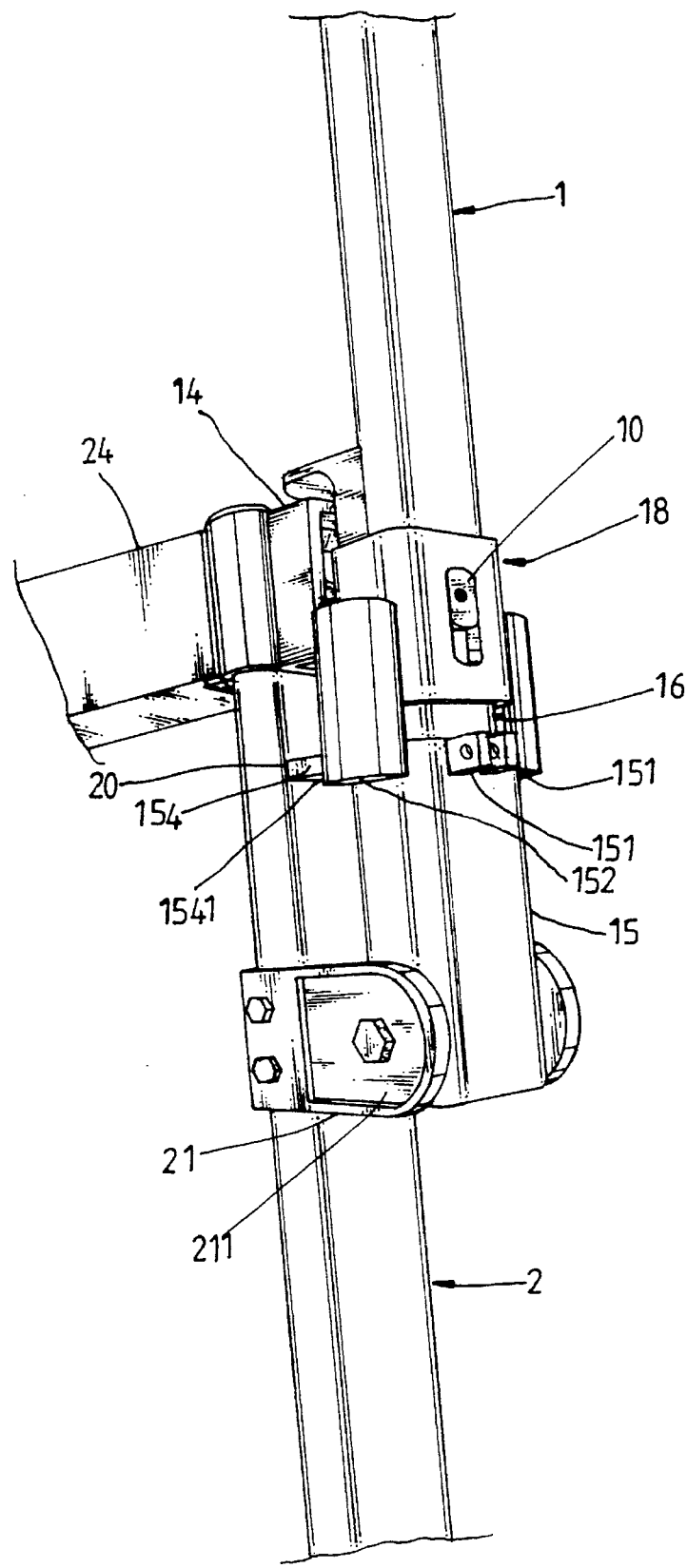
FIG. 7 is similar to FIG. 5 but showing the locking plate moved downwards.
Figure 8:
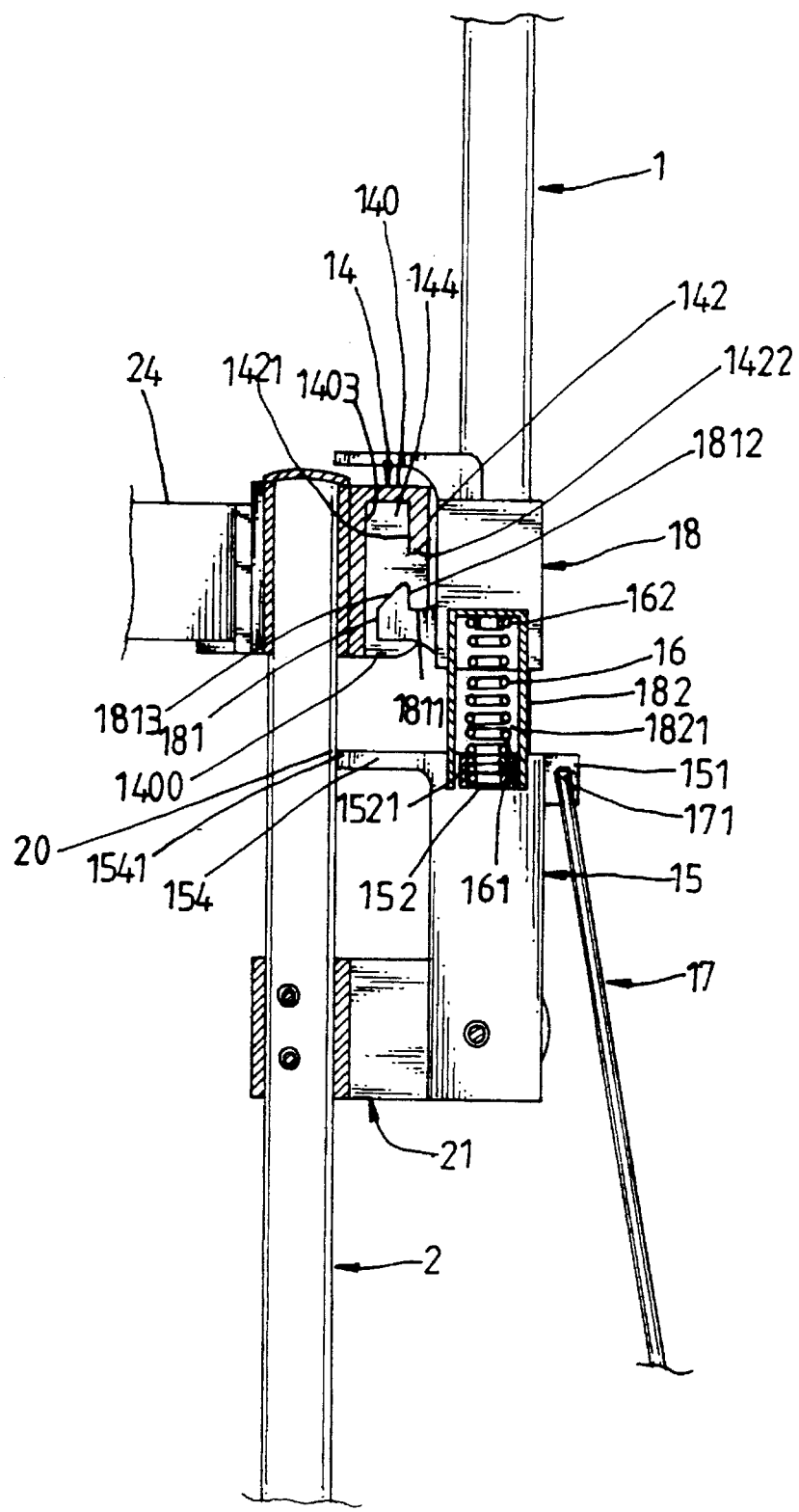
FIG. 8 is a side view in section of FIG. 7.
Figure 9:
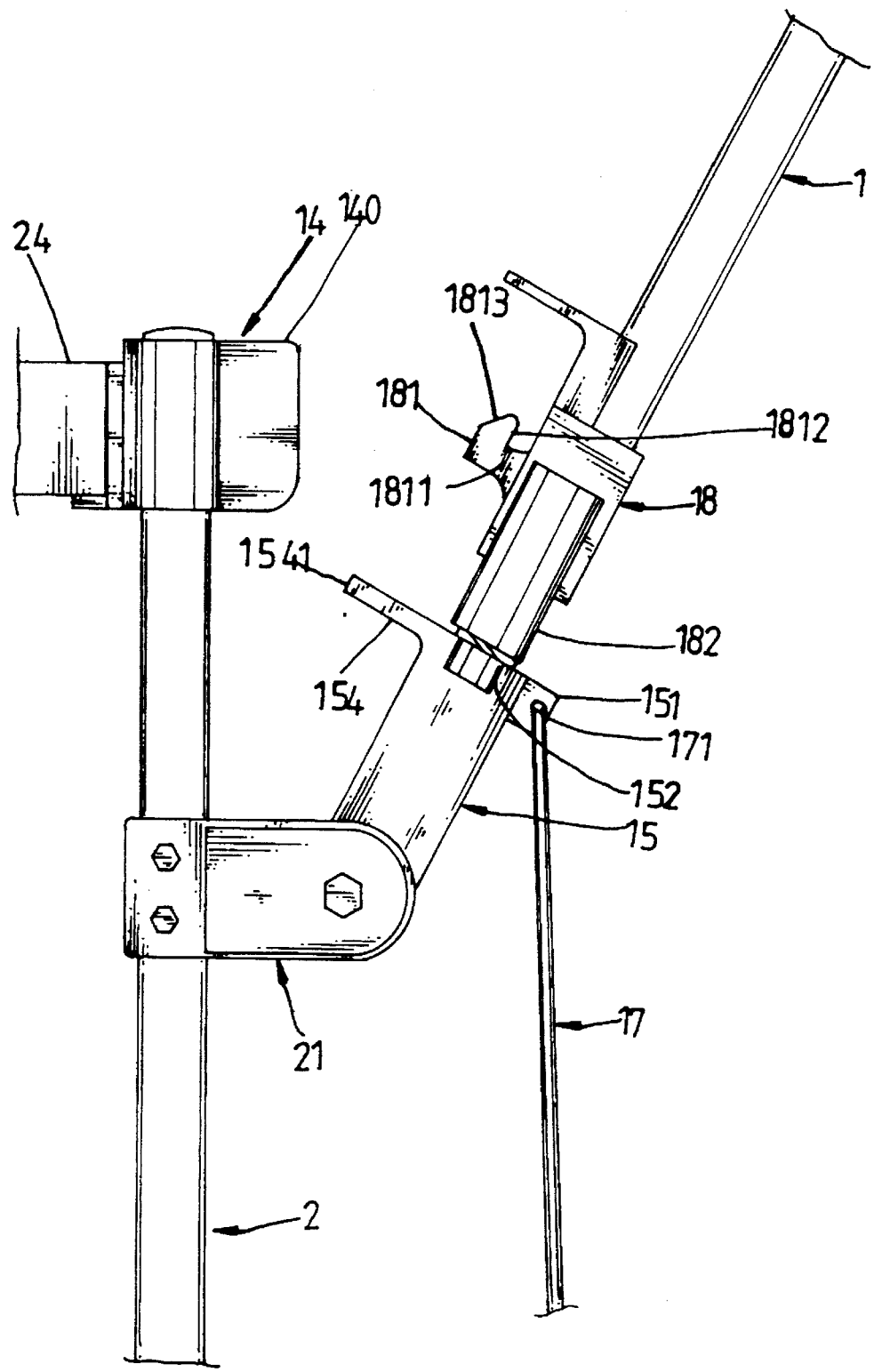
FIG. 9 shows the locking plate disconnected from the locating block according to the present invention.

Referring to FIGS. 5 to 12, the folding collapsible golf cart frame assembly in accordance with the present invention is generally comprised of an elongated handle bar 1, a locking plate 18, a locating block 14, a connecting block 15, an elongated main shaft 2, a handle bracket 21, two springs 16, a wheel holder bracket two links 17, a first bag cradle 24, and a second bag cradle (not shown).

The handle bar 1 has one end terminating in a hand grip, and an opposite end connected to the connecting block 15. The handle bracket 21 is fixedly fastened to the main shaft 2 at a suitable location. The connecting block 15 has one end fixedly fastened to the handle bar 1 and an opposite end pivotably connected between two opposite side wall 211 of the handle bracket 21. The connecting block 15 further comprises two opposite side strips 151 respectively pivotably connected to the top ends 171 of the links 17, and two opposite slide blocks 152. Each of the slide blocks 152 defines a respective hole 1521, which receives the rear end 161 one spring 16. Each of springs 16 has a rear end 161 fastened to the hole 1521 of one slide block 152, and a front end 162 fastened to a hole 1821 in one sliding rail 182 of the locking plate 18. The locking plate 18 is slidably mounted around the handle bar 1, having two sliding rails 182 respectively slidably mounted on the slide blocks 152, and a retainer block 181 for fastening to the shell 140 of the locating block 14. Each of the sliding rails 182 has a hole 1821, which receives the front end 162 of one spring 16. The locating block 14 is fixedly fastened to the handle bar 1. The shell 140 of the locating block 14 comprises two side walls 1400 for securing the retainer block 181 of the locking plate 18. The first bag cradle 24 is mounted on the main shaft 2 and secured to the locating block 14. The wheel holder bracket 23 is fixedly mounted on the main shaft 2 and spaced between the second bag cradle and the handle bracket 21 to hold a wheel holder 231. The wheel holder 231 is pivotably connected to the wheel holder bracekt 23. The bottom ends 172 of the links 17 are respectively pivotably connected to two opposite sides of the wheel holder 231. The handle bracket 21 is fixedly secured to the main shaft 2 at a suitable location, having two opposite side walls 211 respectively pivoted to the connecting block 15 at one end remote from the handle bar 1.

The main features of the folding collapsible frame is outlined hereinafter. The handle bar 1 comprises a stop rod 10 inserted into a longitudinal sliding slot 180 on the locking plate 18 to limited the reciprocating distance of the locking plate 18. The locking plate 18 further compriese a longitudinal sliding slot 180, which receives the stop rod 10 of the handle bar 1. The retainer block 181 of the locking plate 18 comprises a retainer head 1811 having a hooked retaining portion 1812 and a sloping guide wall portion 1813. By means of the sloping guide wall portion 1813, the retainer block 181 can be guided by the sloping guide wall portion 1422 of the shell 140 of the locating block 14 into the inside of the locating block 14, permitting the hooked retaining portion 1812 to be forced by the spring force of the springs 16 into engagement with the inner side 1421 of the stop wall 142 of the locating block 14. The locating block 14 comprises a stop wall 142 raised from the shell 140. The inner side 1421 of the stop wall 142 defines with the inner side 1403 of the shell 140 a retaining hole 144 for the insertion of the retainer block 181 of the locking plate 18, permitting the hooked retainer portion 1812 of the retainer block 181 to be forced into engagement with the inner side 1421 of the stop wall 142. The stop wall 142 has an inward sloping guide wall portion 1422 for guiding the sloping guide wall portion 1813 into the inside of the retaining hole 144. The connecting block 15 further comprises a projecting stop wall 154. The end edge 1541 of the projecting stop wall 154 of the connecting block 15 is stopped at the back side 20 of the main shaft 2 to keep the handle bar 1 and the main shaft 2 in a parallel relation when the retainer block 181 of the locking plte 18 is fastened to the shell 140 of the locating block 14.

Figure 10:
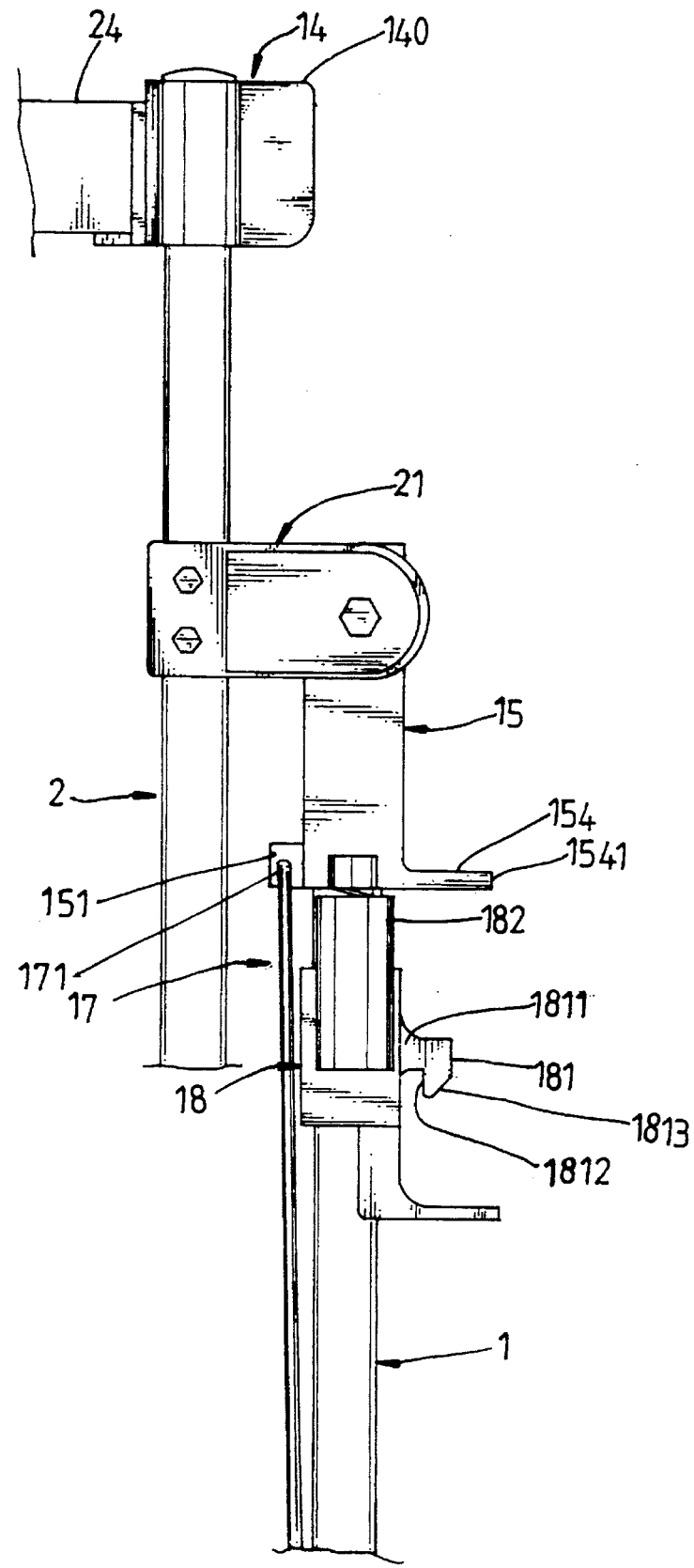
FIG. 10 shows the handle bar turned to the collapsed position according to the present invention.
Figure 11:
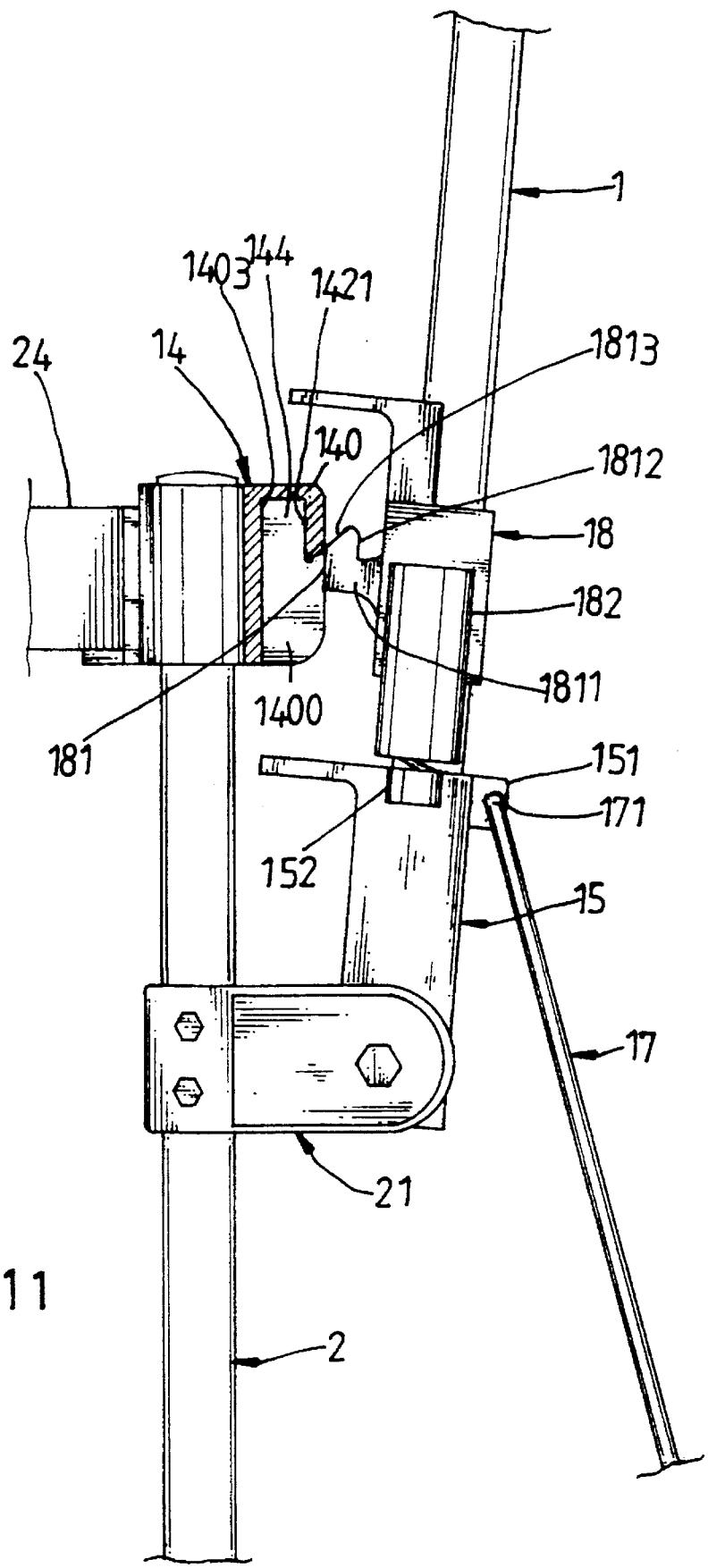
FIG. 11 shows the retainer block of the locking plate moved to the sloping guide wall portion of the stop wall of the locating block according to the present invention.
Figure 12:
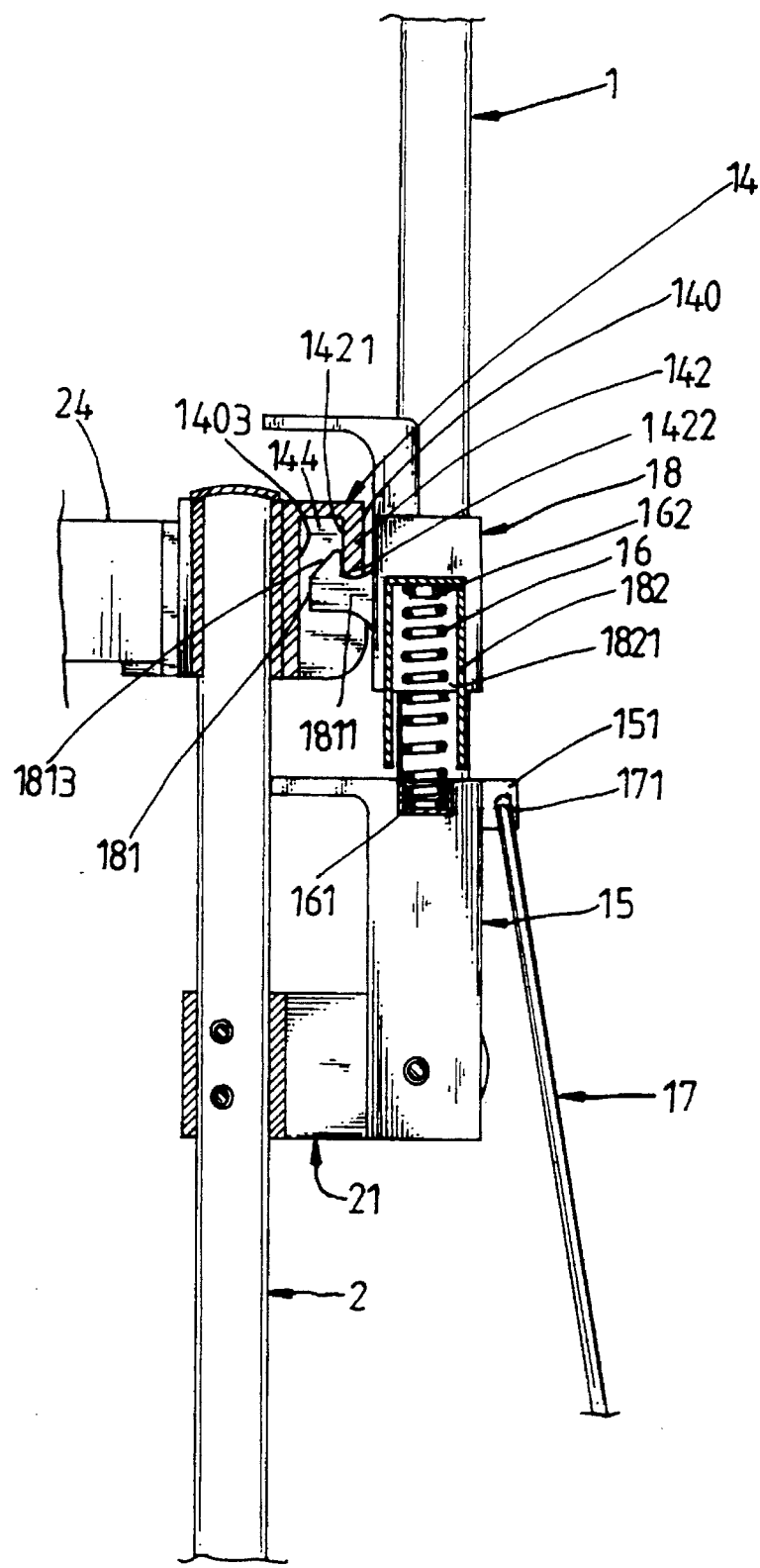
FIG. 12 shows the hooked retainer portion of the retainer block forced into engagement with the inner side of the stop wall of the locating block according to the present invention.

The operation of the folding collapsible frame is easy, and outlined hereinafter. When the locking plate 18 is moved backwards from the locating block 14 toward the handle bracket 21 (see FIGS. 7 and 8) to release the hooked retainer portion 1812 of the retainer block 181 from the inner side 1421 of the stop wall 142 of the locating block 14 (see FIG. 9), the handle bar 1 is unlocked and can be turned away from the locating block 14 to the collapsed position as shown in FIG. 10. When the handle bar 1 is turned from the collapsed postion, the wheel holder 231 and the links 17 are simultaneously moved by the side strips 151 of the connecting block 15 to the collapsed position. On the contrary, when the handle bar 1 is turned from the collapsed position to the operative position, the retainer block 181 of the locking plate 18 is firstly stopped at the sloping guide wall portion 1422 of the stop wall 142 of the locating block 14 (see FIG. 11), and immediately forced into the retaining hole 144 of the locating block 14 by the spring force of the springs 16, causing the hooked retainer portion 1812 to be forced into engagement with the inner side 1421 of the stop wall 142 of the locating block 14, and therefore the handle bar 1 is locked in the operative position (see FIG. 12).

I claim:

1. A folding collapsible golf cart frame assembly comprising an elongated handle bar, a locking plate, a locating block, a connecting block, an elongated main shaft, a handle bracket, two springs, a wheel holder bracket, two links, a first bag cradle, and a second bag cradle, said handle bar having one end terminating in a hand grip and an opposite end connected to said connecting block, said handle bracket being fixedly fastened to said main shaft, said connecting block having one end fixedly fastened to said handle bar, an opposite end pivotably connected between two opposite side walls of said handle bracket, two opposite side strips respectively pivoted to said links, and two opposite slide blocks, said springs each having one end fastened to a hole in one of said slide blocks and an opposite end fastened to a hole in one sliding rail on said locking plate, said locking plate being slidably mounted around said handle bar, having two sliding rails respectively slidably mounted on said slide blocks and a retainer block for fastening to a shell on said locating block, each sliding rail having a hole, which receives one spring, said locating block being fixedly fastened to said handle bar and having a shell for holding said retainer block, said wheel holder bracket being fixedly mounted on said main shaft to hold a wheel holder, said wheel holder being pivotably connected to said wheel holder bracket, said links being pivotably connected between said wheel holder and said connecting block, said handle bracket being fixedly secured to said main shaft, having two opposite side walls respectively pivoted to one end of said connecting block, wherein: said handle bar comprises a stop rod inserted into a longitudinal sliding slot on said locking plate to limit the reciprocating distance of said locking plate; said locking plate comprises a longitudinal sliding slot, which receives the stop rod of said handle bar; the retainer block of said locking plate comprises a retainer head having a hooked retaining portion and a sloping guide wall portion; said locating block comprises a stop wall raised from said shell, and a retaining hole defined between said shell and said stop wall for the insertion of the retainer block of said locking plate, permitting the hooked retainer portion of said retainer block to be forced into engagement with an inner side of the stop wall of said locating block by said springs, the stop wall of said locating block having an inward sloping guide wall portion for guiding the sloping guide wall portion of said retainer block into the inside of the retaining hole of said locating block; said connecting block comprises a projecting stop wall having an end edge, the end edge of the projecting stop wall of said connecting block being stopped at the periphery of said main shaft to keep said handle bar and said main shaft in a parallel relation when said retainer block of said locking plate is fastened to the shell of said locating block.

\* \* \* \* \*